United States Patent
Deltomme

(10) Patent No.: US 11,458,877 B2
(45) Date of Patent: Oct. 4, 2022

(54) MATERIALS TRANSPORT VEHICLE

(71) Applicant: DELTO-PULL SPRL, Manage (BE)

(72) Inventor: Marc Deltomme, Sint Pieters Leeuw (BE)

(73) Assignee: SAFFELBERG INVESTMENTS NV

( * ) Notice: Subject to any disclaimer, the term of this patent is extended or adjusted under 35 U.S.C. 154(b) by 0 days.

(21) Appl. No.: 16/967,774

(22) PCT Filed: Feb. 9, 2018

(86) PCT No.: PCT/EP2018/053345
§ 371 (c)(1),
(2) Date: Aug. 6, 2020

(87) PCT Pub. No.: WO2019/154514
PCT Pub. Date: Aug. 15, 2019

(65) Prior Publication Data
US 2021/0039541 A1  Feb. 11, 2021

(51) Int. Cl.
*B60P 1/00* (2006.01)
*B60P 1/36* (2006.01)

(52) U.S. Cl.
CPC .............. *B60P 1/006* (2013.01); *B60P 1/365* (2013.01)

(58) Field of Classification Search
CPC .................................. B60P 1/006; B60P 1/365
See application file for complete search history.

(56) References Cited

U.S. PATENT DOCUMENTS

| | | | | | |
|---|---|---|---|---|---|
| 2,530,350 | A | * | 11/1950 | Ehlert | A01D 90/10 414/516 |
| 2,726,776 | A | * | 12/1955 | Myers | B65F 3/28 414/513 |
| 3,211,308 | A | * | 10/1965 | Glass | B60P 1/40 414/501 |
| 3,796,330 | A | * | 3/1974 | Dehner | B60P 1/006 414/525.6 |

(Continued)

FOREIGN PATENT DOCUMENTS

| | | |
|---|---|---|
| CH | 446182 A | 10/1967 |
| DE | 3920286 A1 | 3/1990 |
| EP | 2634042 A1 | 9/2013 |

OTHER PUBLICATIONS

Search Report for International Patent Application PCT/EP2018/053345, dated Aug. 15, 2019.

*Primary Examiner* — Saul Rodriguez
*Assistant Examiner* — Ashley K Romano
(74) *Attorney, Agent, or Firm* — Fresh IP PLC; Clifford D. Hyra; Aubrey Y. Chen

(57) ABSTRACT

A vehicle on which a container (1) is mounted for transporting materials, said container comprising a movable partition (10) extending transversely inside the container. The vehicle comprises a motor (16) pulling on a pair of cables (14a, 14b), the front ends of which are connected to the partition (10) on either side, in order to pull the partition (10) towards the rear of the container so as to unload the materials. The cables run along the side walls (4a, 4b) of the container, at a distance from a bottom of the container. The side walls (4a, 4b) of the container have projections (24a, 24b) each extending towards the inside of the container and overhanging the cables so that said cables are protected from falling materials during loading of the container from above.

15 Claims, 7 Drawing Sheets

(56) References Cited

U.S. PATENT DOCUMENTS

| | | | | |
|---|---|---|---|---|
| 4,078,682 | A | | 3/1978 | Johnson, Jr. |
| 4,164,293 | A | * | 8/1979 | Oelberg .................... B65F 3/00 414/525.52 |
| 4,199,297 | A | * | 4/1980 | Abolins ................. B60P 1/006 414/525.6 |
| 5,009,564 | A | * | 4/1991 | Lutz .......................... B60P 7/14 414/512 |
| 5,143,508 | A | * | 9/1992 | Lutz ........................ B60P 1/006 198/747 |
| 5,314,290 | A | * | 5/1994 | Lutz ....................... B65D 88/60 414/509 |
| 5,868,241 | A | * | 2/1999 | Pellegrino .............. B65G 27/08 198/763 |
| 7,866,925 | B1 | * | 1/2011 | Matlack ................... B60P 7/14 410/34 |
| 8,647,044 | B2 | * | 2/2014 | Stewart ................... B60P 1/365 414/510 |
| 2016/0129822 | A1 | * | 5/2016 | Maertens ................ B60P 1/006 414/510 |
| 2019/0291623 | A1 | * | 9/2019 | Marble .................... B60P 1/38 |
| 2020/0001767 | A1 | * | 1/2020 | Vollmering ............. B66D 1/80 |

* cited by examiner

MATERIALS TRANSPORT VEHICLE

FIELD OF THE INVENTION

The invention relates to the field of vehicles comprising a container for loading, transporting and unloading materials. More particularly, the invention relates to such a vehicle comprising means to unload said materials without the need to move the container.

STATE OF THE ART

Vehicles with tipping trailers for the transportation of materials are known, for example. For economic reasons, there is a tendency to prefer ever larger tippers. These are unsuitable, however, when the unloading sites are cramped and prevent dumping (tipping of the trailer), such as in a tunnel for example or in a building. Moreover, dumping presents numerous safety problems, particularly the risk of the vehicle tipping over, for example when it is on non-horizontal ground and/or there are high winds.

In order to overcome these drawbacks, vehicles have been designed in which the container intended to contain the materials comprises a movable partition that can be forcibly moved from front to back inside the container in order to unload the materials through a rear door of the container without the need to tip the container.

In order to forcibly move the partition, patent U.S. Pat. No. 4,260,317 proposes using an actuator mounted between a front wall of the container and the movable partition. The cylinder of such an actuator occupies a considerable longitudinal space, which reduces the effective load volume. Moreover, if the container exceeds a certain length, a telescopic actuator must be used, which is heavy and expensive.

In order to overcome this drawback, traction means using cables or chains and a motor have been used. Such a vehicle is known from U.S. Pat. No. 5,314,290. The container of this vehicle comprises a movable transverse partition that is pulled backwards by means of traction cables connected to a motor. During traction, the movable partition will, however, undergo significant torsional stress and if the material to be unloaded is sticky, such as wet earth for example, the partition may tip over under the effect of the reaction of the material. The traction cables can also be subject to impacts resulting from materials falling into the container when the latter is being loaded and as a result they can be damaged or wear prematurely.

Patent CH446 182 describes a garbage truck comprising a tipping container. The container comprises a movable partition that is pulled backwards by means of a pair of endless chains. These chains are housed in grooves made within the side walls of the container. This dictates the need for hollow walls and is not therefore suitable for containers with solid side walls, which is usually the case in the vehicles concerned. Moreover, the material loaded into the container will inevitably become lodged in the grooves, which will cause premature wear of the chains and indeed could destroy them if the material is granular and hard, such as gravel for example. Lastly, the grooves constitute a route along which the material can pass to the other side of the movable partition when it is being unloaded, that is to say towards the front of the container, which is clearly undesirable.

SUMMARY OF THE INVENTION

One of the objects of the invention is to provide a vehicle equipped with a container comprising a movable partition pulled towards the rear by one or more flexible mechanical connections, such as one or more cables for example, and which at least partially solves the problems of known vehicles of this type. One particular object of the invention is to provide such a vehicle that requires less maintenance and is more durable than known vehicles.

The invention is defined by the independent claims. The dependent claims define the preferred embodiments of the invention.

According to the invention a vehicle comprising a container for loading, transporting and unloading materials is provided, said container extending longitudinally along a front-to-back axis of the vehicle and comprising:
  a left side wall and a right side wall,
  an opening rear wall for unloading said materials,
  a movable partition extending transversely inside the container,
  a first flexible mechanical connection, a front end of which is connected to a left end of the partition and extends first horizontally towards the back of the vehicle along an inner face of the left side wall, then downwards or upwards via at least one first pulley,
  a second flexible mechanical connection, a front end of which is connected to a right end of the partition and extends first horizontally towards the back of the vehicle along an inner face of the right side wall, then downwards or upwards via at least one second pulley.

The vehicle also comprises a motor assembly, the stator of which is fixed to the vehicle frame and the rotor of which is connected to a rear end of the first and second mechanical connection in order to pull them and thus draw the movable partition forcibly towards the rear of the container.

The front end of the first mechanical connection is connected to the left end of the partition, at a height H1 of between 10% and 90% of a height H2 of the partition, and the front end of the second mechanical connection is connected to the right end of the partition at the height H1.

The left side wall also comprises a first longitudinal part overhanging the first mechanical connection, and the right side wall comprises a second longitudinal part overhanging the second mechanical connection. The container of the vehicle is a container designed for loading, transporting and unloading solid or liquid materials. The container can be a tipper, an enclosed container, a tank, etc. In the case of a container designed for loading, transporting and unloading solid materials, said container is preferably a box open at at least one upper part.

Thanks to the position of the connection between the two mechanical connections and the partition, the movable partition will undergo less stress than if these connections were fixed to the bottom of the partition. The partition will also be less likely to tip over due to the effect of the reaction of the material while the latter is being unloaded. Preferably, the height H1 is between 30% and 70% of the height H2. Moreover, the fact that the mechanical connections are overhung by parts of the side walls of the container reduces the risk of damage to these connections during loading of the container from above.

Lastly, the side walls of the container of such a vehicle need not be hollow and can thus consist only of solid materials such as solid steel sheets for example.

Preferably, the side walls consist of longitudinally-folded steel sheets, the sheet of the left side wall comprises a first fold forming the first longitudinal part overhanging the first mechanical connection, and the sheet of the right side wall comprises a second fold forming the second longitudinal part overhanging the second mechanical connection. This enables the container to be made without the need to fundamentally modify the known processes of manufacture of folded sheet steel containers.

Alternatively, the container preferably comprises a first piece applied to the left side wall and forming the first longitudinal part overhanging the first mechanical connection, and a second piece applied to the right side wall and forming the second longitudinal part overhanging the second mechanical connection. This alternative enables a container made according to the known container-manufacturing processes to be easily converted.

According to a preferred embodiment, the floor and side walls of the container are formed of a single piece of folded sheet steel. Alternatively, several folded and joined sheets can be used.

Preferably, the two flexible mechanical connections are cables, which reduces the friction between said connections and the material with which they are in contact and which also ensures longer life.

Preferably, the inner face of the left side wall has a clearance of at least 2 cm below the first mechanical connection, and the inner face of the right side wall has a clearance of at least 2 cm below the second mechanical connection. This prevents the material from lodging between one and/or the other of the mechanical connections and the container.

Preferably, the first flexible mechanical connection and the second flexible mechanical connection are joined together to form a single flexible mechanical connection and said single flexible mechanical connection is joined freely to the movable partition. This has the advantage that if the single flexible mechanical connection breaks, no further traction will be exerted on the partition by the motor assembly if the rotor of the motor assembly continues to operate after the break.

More preferably, said single flexible mechanical connection is joined freely to the partition by means of a third pulley and a fourth pulley mounted at the left end and at the right end respectively of the movable partition. Even more preferably, the third pulley and the fourth pulley are mounted in front of the movable partition, which protects and reduces the risk of crushing said pulleys.

BRIEF DESCRIPTION OF THE FIGURES

These aspects as well as other aspects of the invention will emerge more clearly from the detailed description of the particular embodiments of the invention with reference to the drawings, in which.

The drawings in the figures are not drawn to scale or in proportion. Generally speaking, similar or identical elements are denoted by identical reference numerals in the figures.

DETAILED DESCRIPTION OF THE EMBODIMENTS OF THE INVENTION

Figure 1:
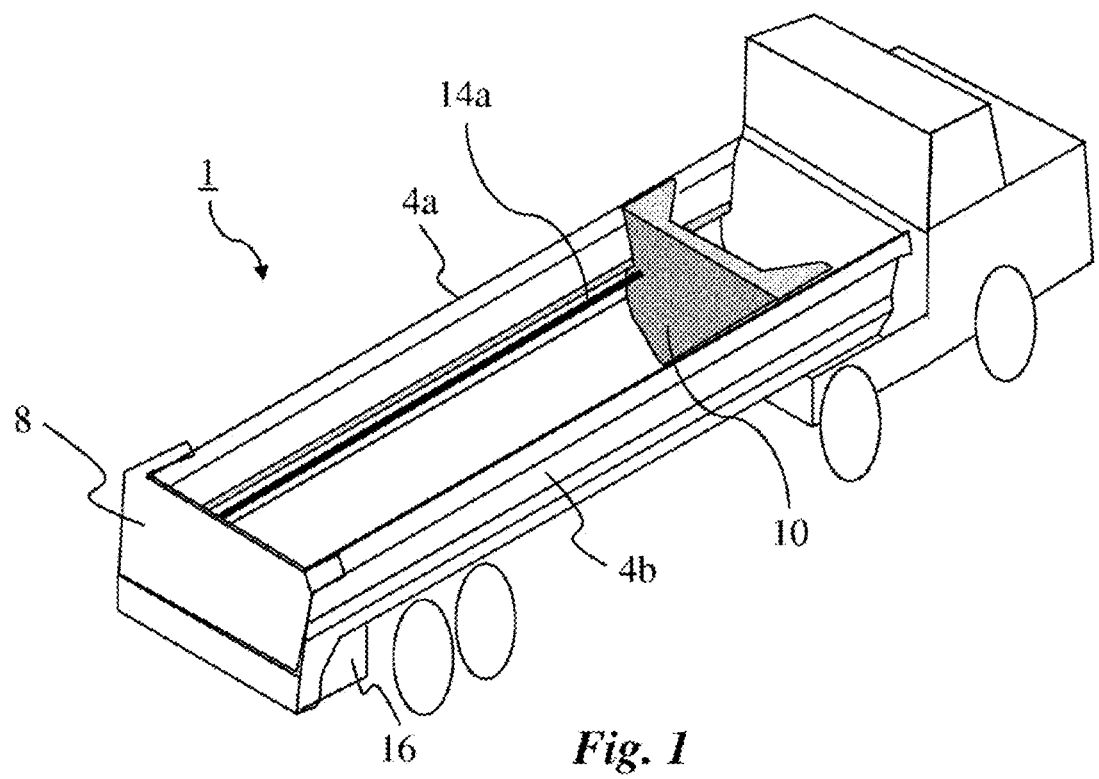
FIG. 1 is a perspective view of a vehicle according to the invention.

FIG. 1 is a perspective view of an example of a vehicle according to the invention. The vehicle can be a truck, a semi-trailer, a wagon, a tanker-truck, etc.

The vehicle comprises a container (1) for loading, transporting and unloading solid or liquid materials, preferably solid materials. The container can be a tipper, an enclosed container, a tank, etc. In the case of a container designed for loading, transporting and unloading solid materials, said container is preferably a box open at least at one top part.

The container (1) extends longitudinally along a front-to-back axis of the vehicle and has a length L preferably between 4000 mm and 15000 mm, and a width W preferably between 2000 mm and 3000 mm. The container (1) comprises a left side wall (4a), a right side wall (4b) and an opening rear wall (8) (for example a tipping door) to unload the material. Preferably, the left and right side walls (4a, 4b) are of sheet steel. Preferably the left and right side walls (4a, 4b) are solid, that is to say not hollow.

The container (1) also comprises a movable partition (10) extending transversely inside the container (1). This partition can for example be a simple metal plate, straight or curved and optionally provided with buttresses (20).

The container (1) is preferably open or openable from above so that the materials can be loaded into it from above. The container (1) can for example be completely open from above or comprise a door or tarpaulin or any other equivalent means enabling access to its internal volume from above.

Although FIG. 1 shows a container with a front wall (opposite the rear face (8)), this front wall is not essential given that the movable partition (10) can serve as a front wall. Preferably, the container has no front wall and if it does it optionally comprises cross-members connecting the front ends of the left (4a) and right (4b) side walls and serving as reinforcements.

Figure 2:
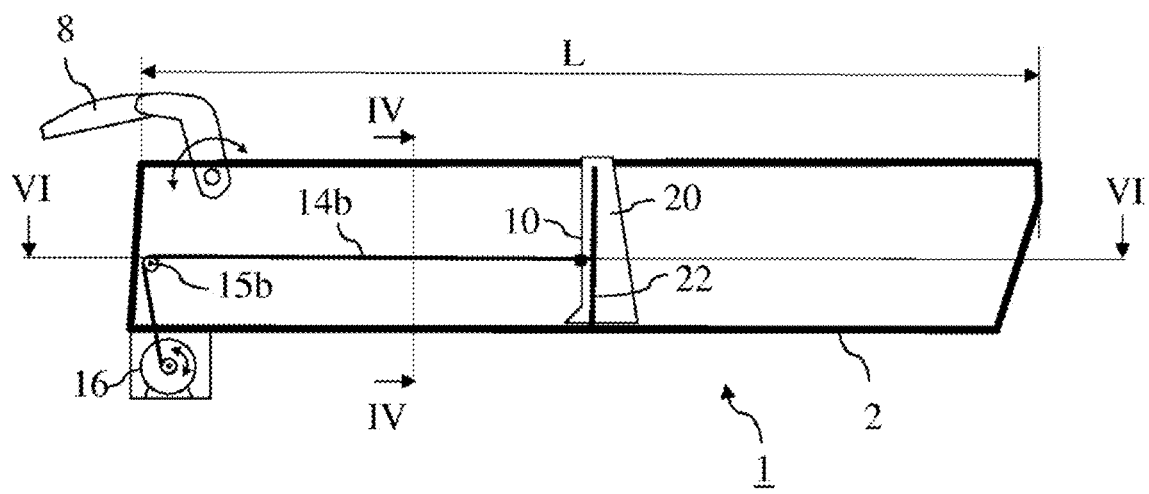
FIG. 2 is a schematic cross-sectional view of the container of the vehicle in FIG. 1.

FIG. 2 is a schematic cross-sectional view of the vehicle in FIG. 1 in which the rear wall (door) is open. For the sake of clarity, the vehicle is no longer represented in this figure nor in the following ones but it is clearly present.

It will be seen that the container (1) also comprises:

a first flexible mechanical connection (14a), one front end of which is attached to a left end of the partition and which extends first horizontally towards the rear of the vehicle along an inner face of the left side wall (4a), then downwards via at least one first pulley (15a), and a second flexible mechanical connection (14b), one front end of which is attached to a right end of the partition and which extends first horizontally towards the rear of the vehicle along an inner face of the right side wall (4b), then downwards via at least one second pulley (15b).

The vehicle also comprises a motor or motor assembly (16), the stator of which is fixed to the vehicle and the rotor of which is connected to a second rear end of the first mechanical connection (14a) and of the second mechanical connection (14b) in order to pull them and thus draw the movable partition (10) forcibly towards the rear (8) of the container (1).

The motor assembly (16) can for example comprise an electric motor or a hydraulic motor onto the drive shaft of which the mechanical connections (14a, 14b) wind. Note that in the case of a hydraulic motor, and by analogy with an electric motor, the word "stator" describes the fixed part of the motor, while the word "rotor" describes the movable (rotating) part of the motor and comprises a drive shaft.

A speed reducer will preferably be provided in order to reduce the speed of rotation and increase the output torque of the motor assembly, that is to say where the mechanical connections are engaged with the drive shaft of the motor assembly. An independent motor can be provided for each mechanical connection or just one motor to drive both mechanical connections at the same time. Preferably, only one motor will be used to pull the two mechanical connections as this facilitates the synchronization of the movements of both connections.

Preferably, the motor assembly will also comprise a torque limiter in order to prevent breakage of the mechanical connections if the resisting force becomes too close to the breaking force of the mechanical connections. Clearly, means to control the motor assembly will also be provided so that an operator can start and stop the movement of the movable partition. A speed controller can also be provided. As these means are known, they will not be described in further detail here.

Preferably, the motor assembly (16) is located outside the container (1), more preferably beneath the container (1), even more preferably beneath the container (1) and at a rear end of the container (1), as shown in FIG. 2.

It will be noted that other configurations are possible and it may be alternatively arranged that:
  the first pulley (15a) directs the first mechanical connection towards the top and then another pulley directs the first mechanical connection towards the front of the container, and that
  the second pulley (15b) directs the second mechanical connection towards the top and then yet another pulley directs the second mechanical connection towards the front of the container, and that
  the motor assembly is for example mounted at the front of the vehicle.

In this alternative, yet more pulleys can be provided that direct the first and second mechanical connection towards yet other places where there is a motor assembly.

According to a preferred version, the axes of the first pulley (15a) and of the second pulley (15b) are inclined in relation to the horizontal.

Figure 3A:
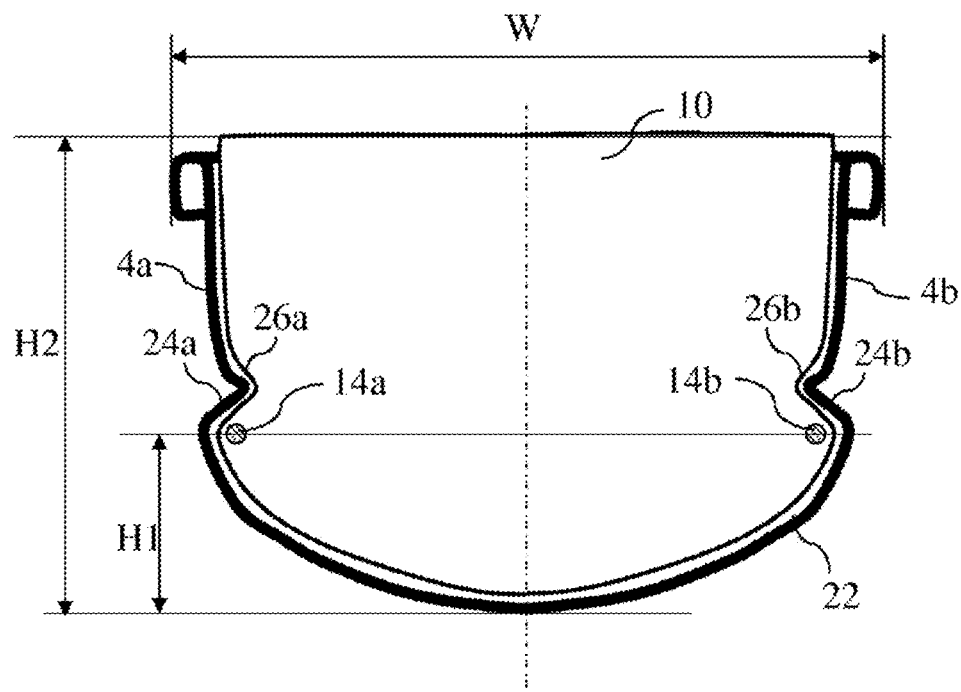
FIG. 3a is a cross-sectional view along plane IV-IV of the container in FIG. 2.

FIG. 3a is a cross-sectional view along plane IV-IV of the container in FIG. 2. It will be seen that the front end of the first mechanical connection (14a) is fixed to the left end of the partition (10), at a height H1 of between 10% and 90% of a height H2 of the partition, and that the front end of the second mechanical connection (14b) is fixed to the right end of the partition (10) at height the H1, which reduces the torsional stress on the partition (10) when the latter is set in motion. Preferably, the height H1 is between 20% and 80% of the height H2. More preferably, the height H1 is between 30% and 70% of the height H2. Even more preferably, the height H1 is between 40% and 60% of the height H2. The mechanical connections (14a, 14b) are preferably fixed on the "active" face side of the movable partition (10) (that facing the rear partition, that is to say that which is in contact with the transported material), for example by means of a lug or ring passing into a bracket integral with the partition. Alternatively, orifices pass through the partition from one side to the other and the mechanical connections are inserted in these orifices and fixed on the "passive" face side of the partition.

These two fixing methods prevent the mechanical connections from passing between the movable partition and the side walls (4a, 4b) of the container. It will also be seen that the left side wall (4a) of the container (1) comprises a first longitudinal part (24a) overhanging the first mechanical connection (14a), and that the right side wall (4b) of the container (1) comprises a second longitudinal part (24b) overhanging the second mechanical connection (14b). This has the effect of protecting the mechanical connections from the fall of materials when loading these materials into the container (1) from above.

The first longitudinal part (24a) can for example be formed by a first fold in the sheet steel of the left side wall (4a), as shown in FIG. 3a. The same applies to the second longitudinal part (24b). On either side, the partition comprises chamfers (26a, 26b) of a corresponding shape, so as to be able to slide backwards and forwards in the container without problems. It goes without saying that other shapes can be given to the side walls (4a, 4b) enabling each to have a part overhanging the mechanical connections along all or part or their horizontal length.

Figure 3B:
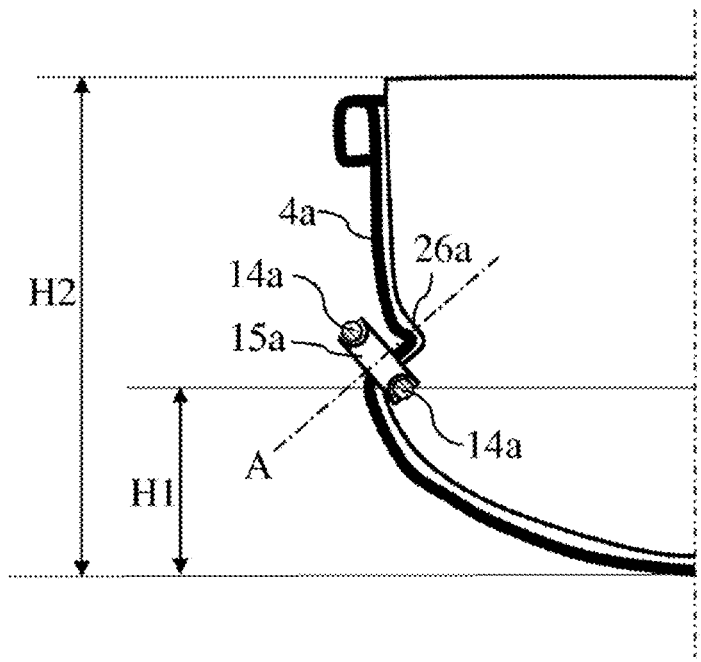
FIG. 3b is a partial view of the rear of the container in FIG. 2, according to one embodiment.

FIG. 3b is a partial view of the rear of the container in FIG. 2 according to one embodiment. It shows the first pulley (15a), the axis A of which is preferably inclined in relation to the horizontal. The first mechanical connection, coming from the movable wall, arrives horizontally at the first pulley from the bottom of said pulley, makes a partial turn around it, then sets off again, for example downwards. The advantage of this inclination of the axis A is that the first mechanical connection can be laterally offset and thus cause less hindrance to the unloading of goods. The same arrangement preferably applies to the second pulley (15b), not shown in FIG. 3b but arranged symmetrically in relation to the central plane shown by the dotted-dashed line in the figure.

Figure 3C:
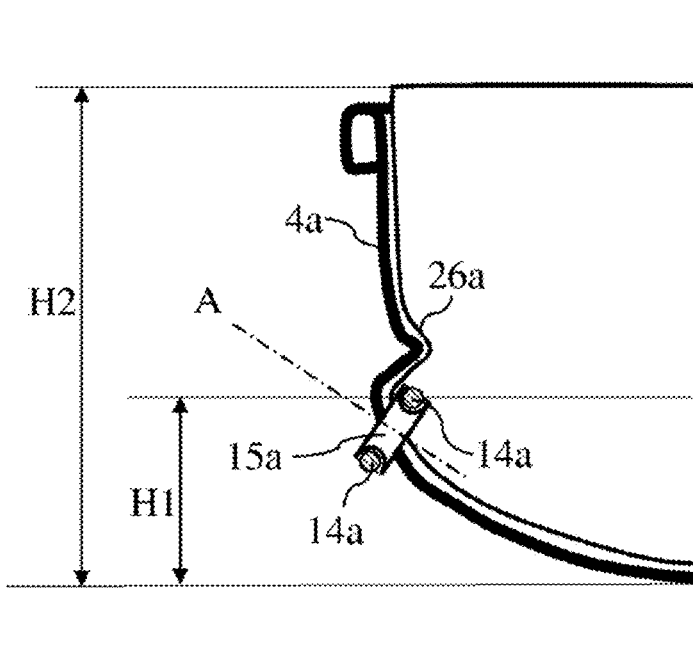
FIG. 3c is a partial view of the rear of the container in FIG. 2, according to another embodiment.

FIG. 3c is a partial view of the rear of the container in FIG. 2, according to another embodiment. It shows the first pulley (15a), the axis A of which is preferably inclined in relation to the horizontal. The first mechanical connection, coming from the movable wall, arrives horizontally at the first pulley from above said pulley, makes a partial turn around it, then sets off again, for example upwards. The advantage is the same as with FIG. 3b.

Figure 4:
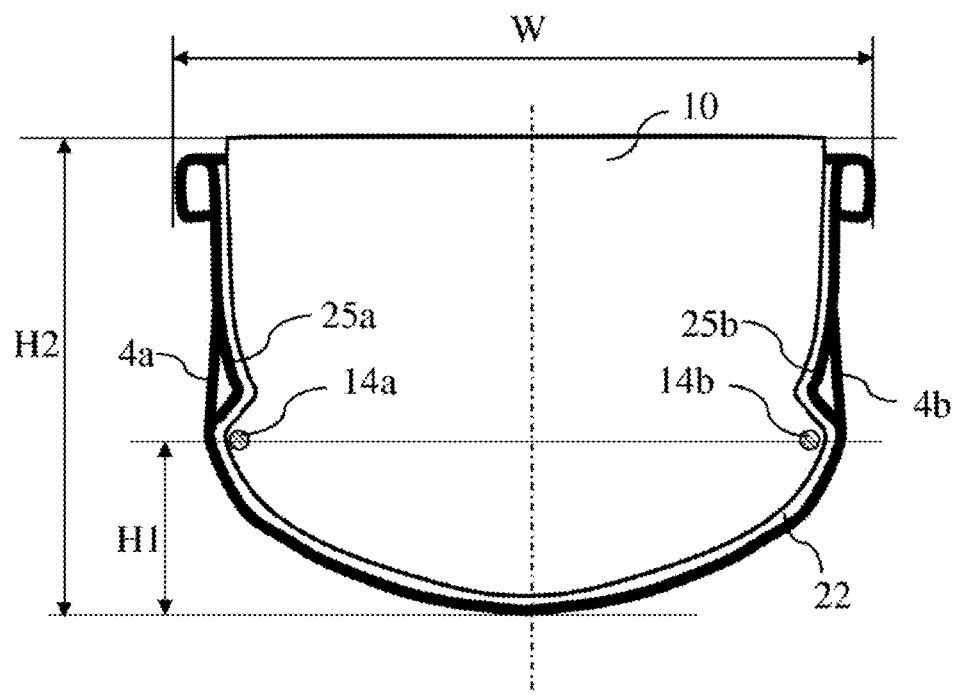
FIG. 4 is a cross-sectional view along plane IV-IV of another embodiment of the container in FIG. 2.

As shown in FIG. 4, the container (1) alternatively comprises a first piece (25a) inserted in the left side wall (4a) and forming the first longitudinal part (24a) overhanging the first mechanical connection (14a), and a second piece (25b) inserted in the right side wall (4b) and forming the second longitudinal part (24b) overhanging the second mechanical connection (14b). The inserted pieces can for example be steel sheets fixed, for example welded or bolted or riveted, to the side faces of the container (1).

Preferably, the inner face of the left side wall (4a) has a clearance of at least 2 cm below the first mechanical connection (14a), and the inner face of the right side wall (4b) has a clearance of at least 2 cm below the second mechanical connection (14b), which prevents the material (18) from becoming wedged between the mechanical connections and the container (1). As shown in FIGS. 3 and 4, the container (1) has no projection in its inner face and along its entire height H1, which constitutes a preferred form of the container (1).

Figure 5:
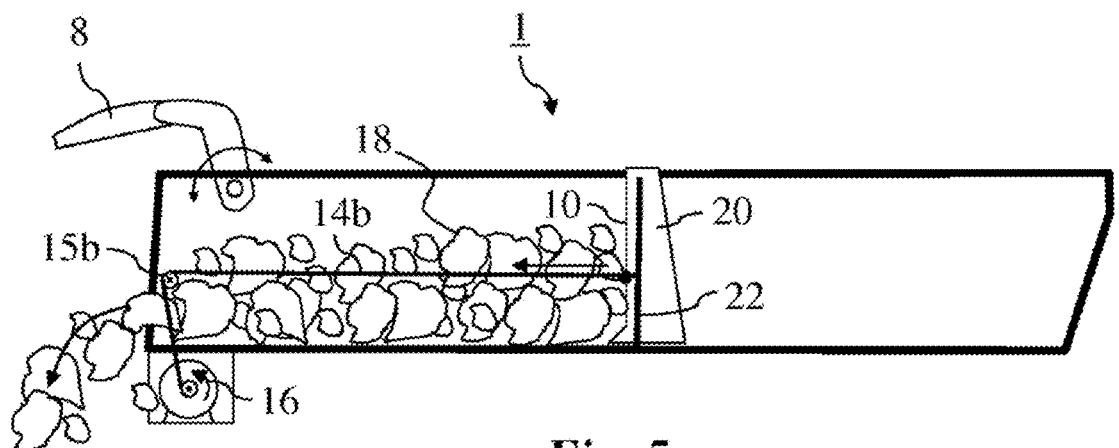
FIG. 5 shows an unloading phase of the container in FIG. 2.

FIG. 5 shows a phase of unloading the materials (18) from the container (1) in FIG. 2. For the sake of clarity, the vehicle is no longer shown in the figure but is clearly present. When the motor assembly (16) is switched on by an operator, the rotor of the motor will wind up the mechanical connection means (14a, 14b), which will have the effect of pulling the movable partition (10) towards the rear of the container (1) (towards the door 8) and will cause the materials (18) to fall out of the container (1). By controlling the duration and/or the power of actuation of the motor assembly (16), the operator can much better control the quantity of materials unloaded than in the case of dumping, which can for example be useful in the case of a partial delivery.

Figure 6:
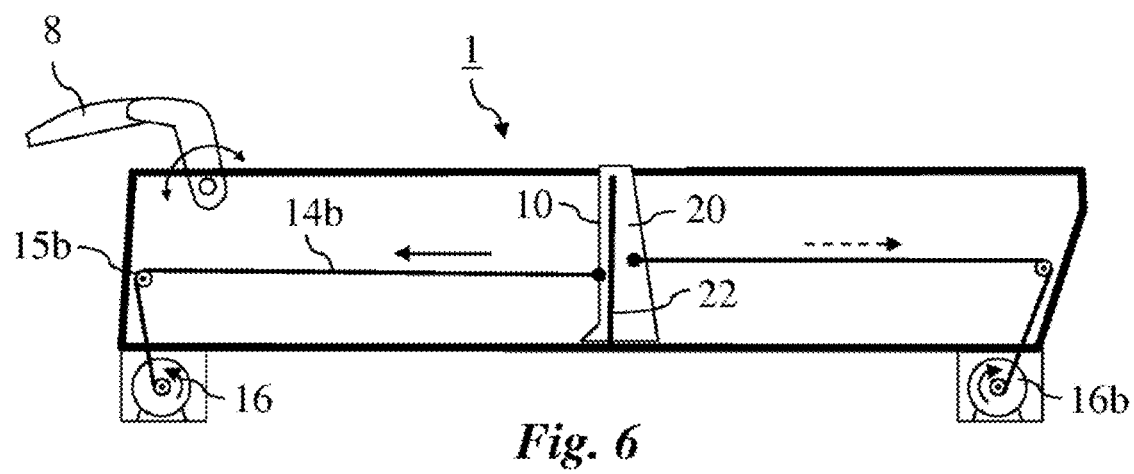
FIG. 6 is a schematic cross-sectional view of a preferred version of the container of the vehicle in FIG. 1.
Figure 7:
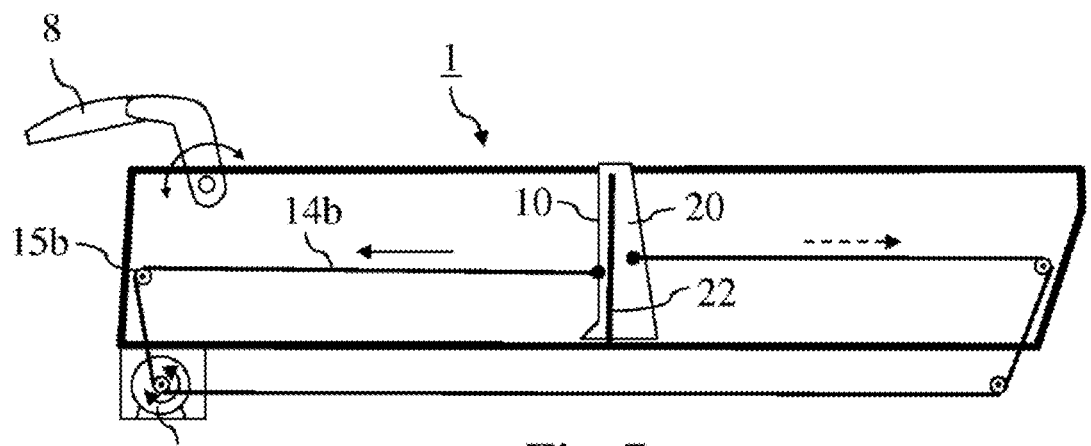
FIG. 7 is a schematic cross-sectional view of an alternative and preferred version of the container of the vehicle in FIG. 1.

Return means (not shown) can be provided in order then to bring the movable partition (10) back towards the front of the container (1) for the next loading of materials. These return means can be identical, equivalent or different to those described above. As shown in FIG. 6, a second pair of flexible mechanical connections can for example be provided, of which one end is connected to the partition and the other end is connected to a second motor assembly (16b) acting alternately and in the opposite direction to the above-described motor assembly (16). This second motor assembly (16b) can be significantly less powerful than the above-described motor assembly (16) given that the container (1) is empty of materials when this second motor assembly (16b) is actuated. Alternatively, the above-described motor assembly (16) can be used for the back and forth movements of the movable partition (10), as shown in FIG. 7. In this latter case, additional pulleys must be provided to bring the second pair of mechanical connections back towards the motor assembly (16).

Preferably, the container (1) is a self-supporting container, the left and right side walls (4a, 4b) of which comprise an assembly of steel sheets having longitudinal folds. Preferably, said sheets have a thickness of between 4 mm and 20 mm.

Preferably, the first flexible mechanical connection (14a) is a cable and the second flexible mechanical connection (14b) is a cable. Preferably, the cables are braided cables. Preferably, they are steel cables. Preferably, neither the first mechanical connection (14a) nor the second mechanical connection (14b) passes between the movable partition and the left side wall (4a) and the right side wall (4b), respectively. This avoids creating a passage for the materials between the movable partition (10) and the container (1) particularly during unloading when the materials are placed under pressure by the movement of the movable partition.

Preferably, at least part of the periphery of the partition (10) comprises a seal (22) extending towards the inner faces of the container (1), which also contributes towards blocking or limiting a passage for the materials between the movable partition (10) and the container (1).

Preferably, the container (1) comprises means for guiding the movable partition (10). Thanks to these guiding means, the movable partition will be better guided when it moves from front to back in the container (1) and vice versa.

Preferably, the guiding means are arranged in a top part of the container (1) and outside the container (1). Thus, the guiding means will not be in contact with the materials (18) transported in the container (1), thus reducing the extent to which they are crushed and/or jammed by said materials.

Figure 8:
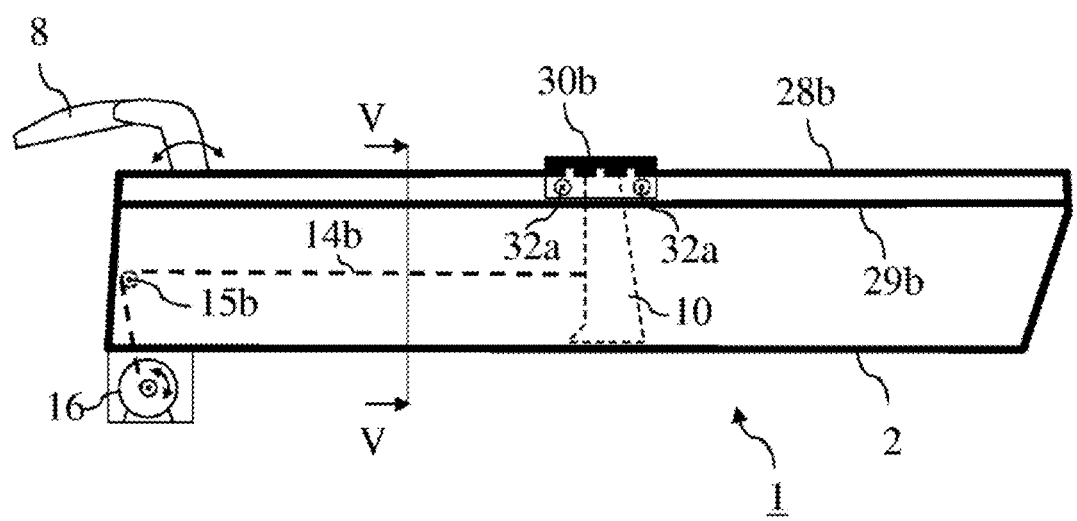
FIG. 8 is a side view of a preferred embodiment of the container in FIG. 1.

An example of such guiding means is illustrated in FIG. 8, which shows a side view of a preferred embodiment of the container in FIG. 1.

In this example, the movable partition (10) is provided at each left and right end and in its upper part with brackets (30a, 30b) to which are connected respectively a first pair of rollers (32a) and a second pair of rollers (32b) with horizontal axes, the rollers of each pair of rollers being arranged longitudinally.

In this example, the guiding means also comprise two pairs of longitudinal rails: a first pair of rails (28a, 29a) being arranged on the outer face of the left side wall (4a) of the container (1), and a second pair of rails (28b, 29b) being arranged on the outer face of the right side wall (4b) of the container (1).

Figure 9:
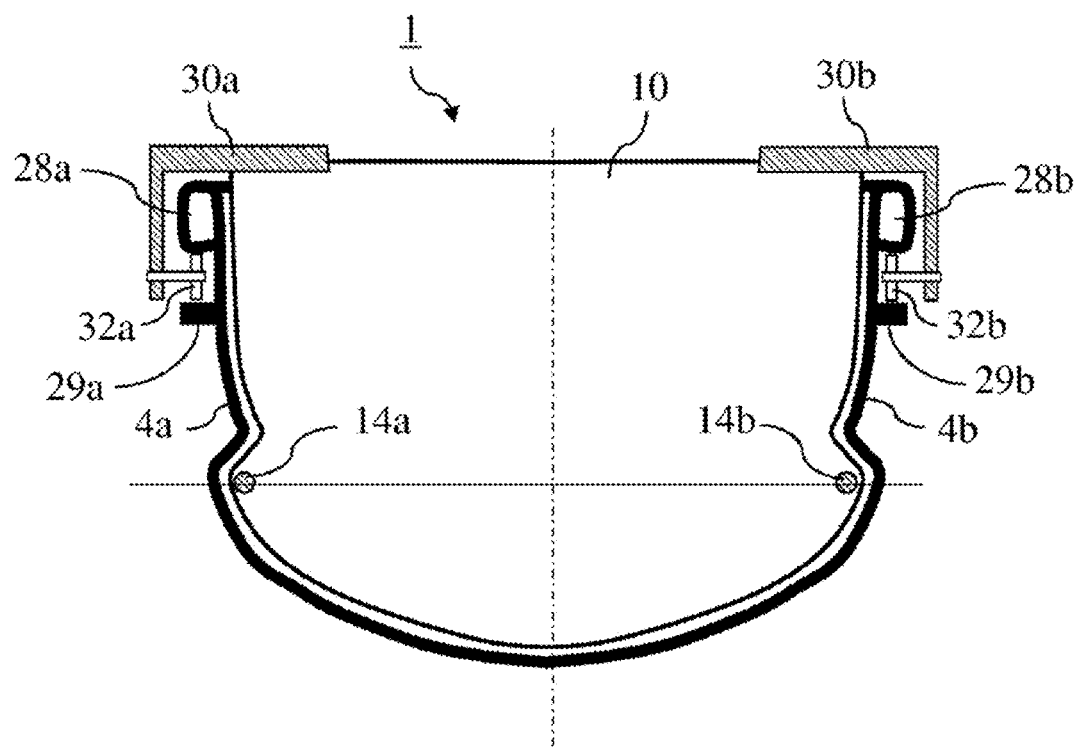
FIG. 9 is a cross-sectional view along plane V-V of the container in FIG. 8.

As shown in FIG. 9, which is a cross-sectional view along plane V-V of the container in FIG. 8, the first pair of rollers (32a) is inserted between and cooperates with the two rails of the first pair of rails (28a, 29a) and the second pair of bearings (32b) is inserted between and cooperates with the two rails of the second pair of rails (28b, 29b), which ensures a guiding of the movable partition (1).

The longitudinal rails (28a, 28b, 29a, 29b) can for example be formed by folding the side walls (4a, 4b) and/or comprise for example pieces inserted in the side walls such as for example profiles fixed to the outer faces of the side walls (4a, 4b).

Clearly, more than two rollers per (left/right) side and/or more than two rails per (left/right) side can be provided. Instead of rollers, wheels or any other equivalent means can be provided.

Preferably, the container (1) is connected in a fixed manner to the vehicle.

Preferably, the first flexible mechanical connection and the second flexible mechanical connection are connected together to form a single flexible mechanical connection and said single flexible mechanical connection is connected freely to the partition. Preferably, the single flexible mechanical connection is a cable or a chain.

Figure 10:
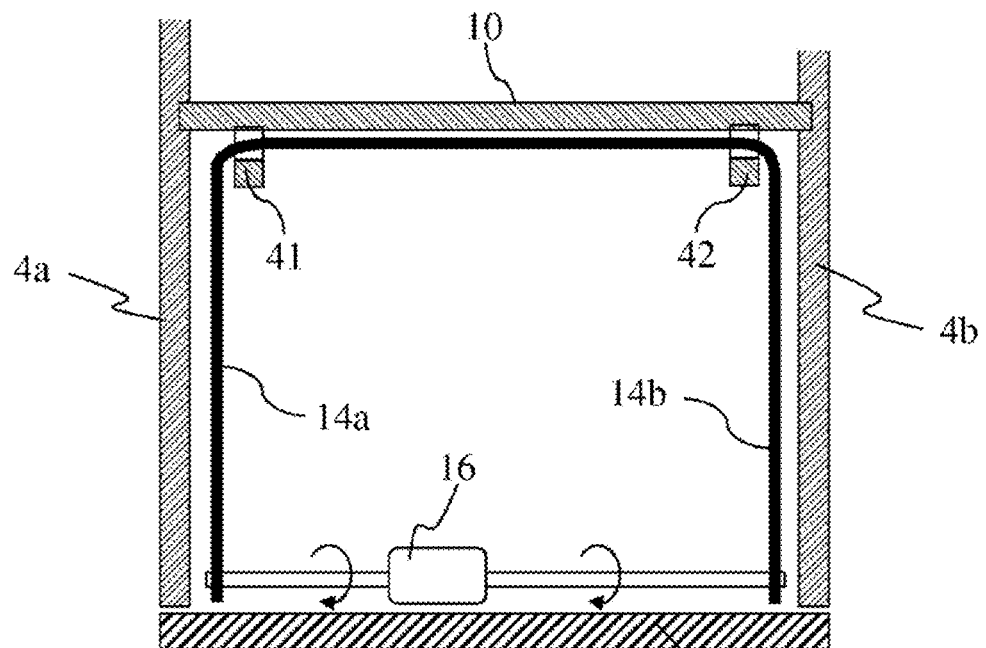
FIG. 10 is a cross-sectional view along plane VI-VI of a part of the container in FIG. 2, according to a preferred embodiment.
Figure 11:
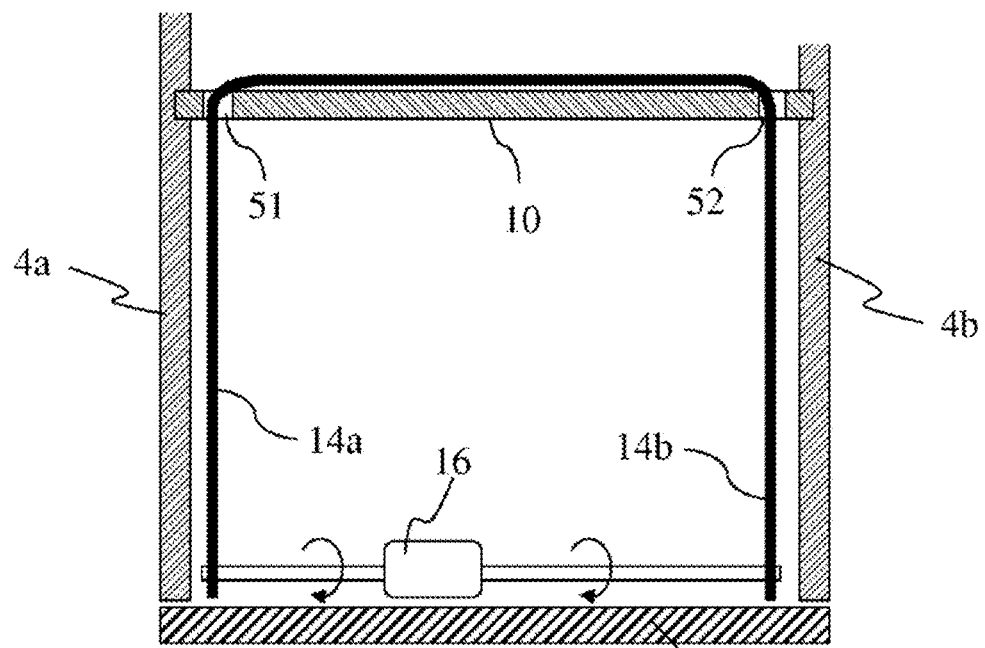
FIG. 11 is a cross-sectional view along plane VI-VI of a part of the container in FIG. 2, according to another preferred embodiment.
Figure 12:
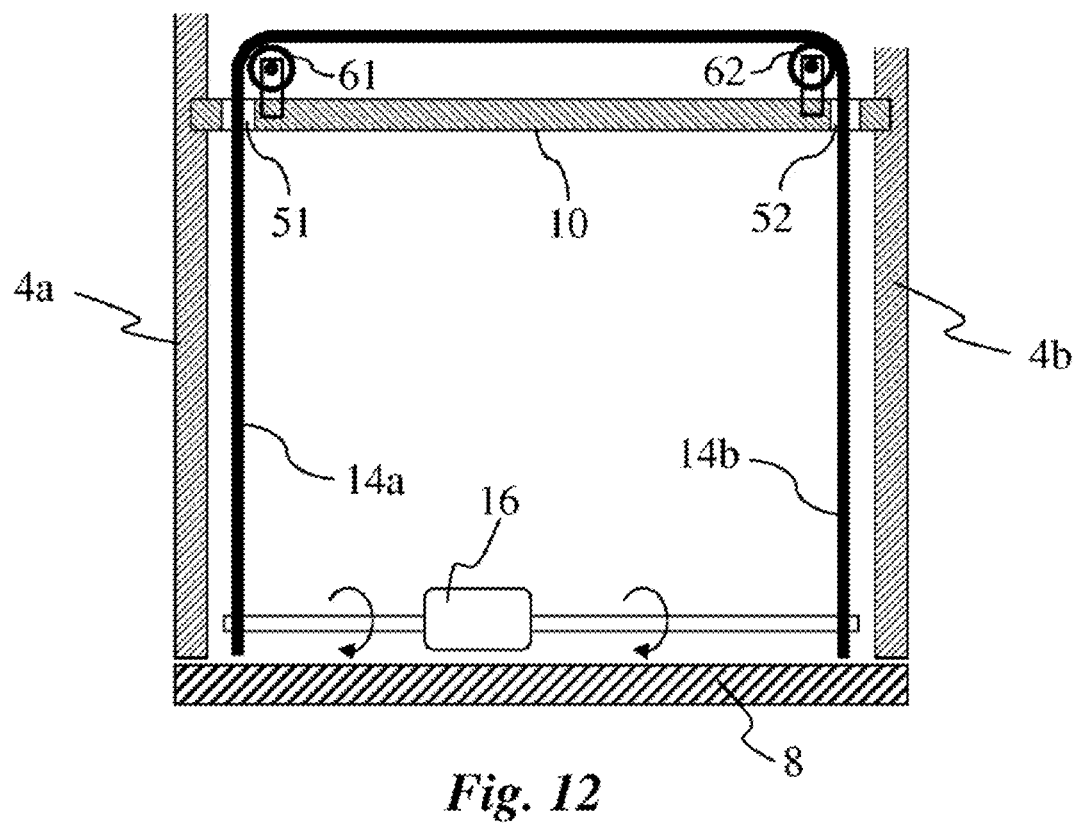
FIG. 12 is a cross-sectional view along plane VI-VI of a part of the container in FIG. 2, according to a more preferred embodiment.

"Connected freely" means that the single flexible mechanical connection is not fixedly connected to the partition but that the single flexible mechanical connection can move freely in relation to the partition. There are several ways of creating such a free connection. FIGS. 10, 11 and 12 show a few examples of this.

FIG. 10 is a cross-sectional view along plane VI-VI of a part of the container of FIG. 2, showing a first embodiment. In this embodiment, the first flexible mechanical connection (14a) and the second flexible mechanical connection (14b) are connected together to form a single flexible mechanical connection. As shown in FIG. 10, the movable partition (10) is provided—at its left and right ends and at the height H1— with two inserted pieces (41, 42) which each have a transverse hole through which the single flexible mechanical connection passes freely. Thus, when the single flexible mechanical connection breaks, for example due to too high a tension, it will no longer exert traction of the movable partition (except for that possibly due to friction forces), even if the rotor of the motor assembly (16) continues to turn after the rupture.

FIG. 11 is a cross-sectional view along plane VI-VI of a part of the container in FIG. 2, showing a second embodiment. In this embodiment, the first flexible mechanical connection (14a) and the second flexible mechanical connection (14b) are also connected together to form a single flexible mechanical connection. As shown in FIG. 11, the movable partition (10) is provided—at its left and right ends and at the height H1—with two holes (51, 52) through which the single flexible mechanical connection passes freely. This embodiment has the advantage that the single flexible mechanical connection passes behind the partition, which protects it better than in the example in FIG. 10.

FIG. 12 is a cross-sectional view along plane VI-VI of a part of the container in FIG. 2, showing a third embodiment. In this embodiment, the first flexible mechanical connection (14a) and the second flexible mechanical connection (14b) are also connected together to form a single flexible mechanical connection. As shown in FIG. 12, the movable partition (10) is provided—at its left and right ends and at the height H1—with two holes (51, 52) through which the single flexible mechanical connection passes freely. The movable partition (10) is also provided—at its left and right ends and at the height H1—with a third pulley (61) with a vertical axis and a fourth pulley with a vertical axis (62) around which the single flexible mechanical connection winds freely and which therefore each serve as a bevel gear.

This preferred embodiment has the same advantages as those shown in FIGS. 10 and 11, and has the additional advantage of reducing the friction forces between the single flexible mechanical connection and the partition, which reduces the traction on the partition and/or the differences in left/right traction when the single flexible mechanical connection breaks. Moreover, the pulleys (61, 62) being located behind the partition (that is to say in front of the partition according to the front/rear axis of the vehicle), are protected from the materials loaded into the container (1) of the vehicle.

The present invention has been described in relation to specific embodiments, which are purely illustrative and in no way limiting. Generally speaking, it will be obvious to a person skilled in the art that the present invention is not limited to the embodiments shown and/or described above. The presence of reference numerals in the drawings cannot be regarded as limiting, including when these numerals are indicated in the claims.

The use of the verbs "comprise," "include," "composed of," or any other variation, as well as their conjugations, shall in no way exclude the presence of elements other than those mentioned.

The use of the indefinite article "a" or of the definite article "the," in order to introduce an element, does not exclude the presence of a plurality of these elements.

The invention can also be described as follows: a vehicle on which a container (1) is mounted for transporting materials, said container comprising a movable partition (10) extending transversely inside the container.

The vehicle comprises a motor (16) pulling on a pair of cables (14a, 14b) connected or connected on either side of the partition (10), in order to pull the partition (10) towards the rear of the container so as to unload the materials. The cables run along the side walls (4a, 4b) of the container, at a distance from a bottom of the container. The side walls (4a, 4b) of the container have projections (24a, 24b) each extending towards the inside of the container and overhanging the cables so that the latter are protected from falling materials during loading from above.

The invention claimed is:

1. Vehicle comprising a container for loading, transporting and unloading materials, said container extending longitudinally along a front-to-back axis of the vehicle and comprising:
   a left side wall and a right side wall,
   an opening rear wall for unloading said materials,
   a movable partition extending transversely inside the container,
   a first flexible mechanical connection, a first part of which is connected to a left end of the partition and extends first horizontally towards the back of the vehicle along an inner face of the left side wall, then upwards or downwards via at least one first pulley,
   a second flexible mechanical connection, a second part of which is connected to a right end of the partition and extends first horizontally towards the back of the vehicle along an inner face of the right side wall, then upwards or downwards via at least one second pulley,
   a motor assembly, the stator of which is fixed to the vehicle frame and the rotor of which is connected to a rear end of the first and second mechanical connection in order to pull them and thus draw the movable partition forcibly towards the rear of the container,
   wherein the first part of the first flexible mechanical connection is connected to the left end of the partition, at a height H1 of between 10% and 90% of a height H2 of the partition,
   wherein the second part of the second flexible mechanical connection is connected to the right end of the partition at the height H1,
   wherein the first flexible mechanical connection and the second flexible mechanical connection are forming a single continuous flexible mechanical connection, and
   wherein the first part and the second part of the single continuous flexible mechanical connection are freely linked to the movable partition such that the single continuous flexible mechanical connection is not fixedly connected to the partition and can move freely with respect to the partition.

2. Vehicle according to claim 1, wherein the height H1 is between 30% and 70% of the height H2.

3. Vehicle according to claim 1, wherein the inner face of the left side wall has a clearance of at least 2 cm below the first mechanical connection, and wherein the inner face of the right side wall has a clearance of at least 2 cm below the second mechanical connection.

4. Vehicle according to claim 1, wherein the container is a self-supporting container, the left, and right side walls of which comprise an assembly of steel sheets having longitudinal folds.

5. Vehicle according to claim 4, wherein the sheets have a thickness of between 4 mm and 20 mm.

6. Vehicle according to claim 1, wherein the single continuous flexible mechanical connection is a cable.

7. Vehicle according to claim 1, wherein neither the first mechanical connection nor the second mechanical connection passes between the movable partition and the left side wall and the right side wall of the container, respectively.

8. Vehicle according to claim 1, wherein at least part of the periphery of the movable partition comprises a seal extending towards the inner faces of the container.

9. Vehicle according to claim 1, wherein the container is an open container in its upper part, wherein said container comprises guiders for guiding movable partition longitudinally along the front-to-back axis of the vehicle, wherein the guiders are arranged in a top part of the container and outside the container, and wherein the guiders comprise two pairs of longitudinal rails, each pair of rails being arranged on the outer faces of the left and right side walls of the container.

10. Vehicle according to claim 1, wherein the container is fixedly connected to the vehicle.

11. Vehicle according to claim 1, wherein the axes of the first pulley and the second pulley are inclined in relation to the horizontal.

12. Vehicle according to claim 1, wherein the single flexible mechanical connection is linked freely to the movable partition by means of a third pulley and a fourth pulley mounted at the left end and at the right end, respectively, of the movable partition.

13. Vehicle according to claim 1, wherein the left side wall comprises a first longitudinal part overhanging the first mechanical connection, and wherein the right side wall comprises a second longitudinal part overhanging the second mechanical connection.

14. Vehicle according to claim 13, wherein the left side wall comprises a first fold forming the first longitudinal part overhanging the first mechanical connection, and wherein the right side wall comprises a second fold forming the second longitudinal part overhanging the second mechanical connection.

15. Vehicle according to claim 13, wherein the container comprises:
   a first piece inserted in the left side wall and forming the first longitudinal part overhanging the first mechanical connection, and
   a second piece inserted in the right side wall and forming the second longitudinal part overhanging the second mechanical connection.

\* \* \* \* \*